Aug. 12, 1969   G. N. JORGENSEN   3,461,222
INSULATED BUS BARS
Filed May 22, 1967
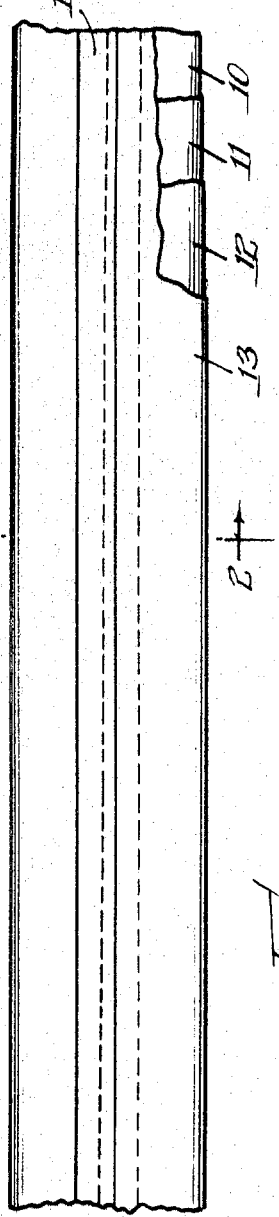
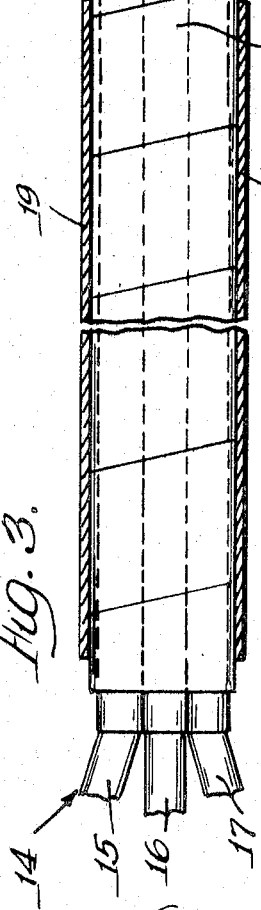
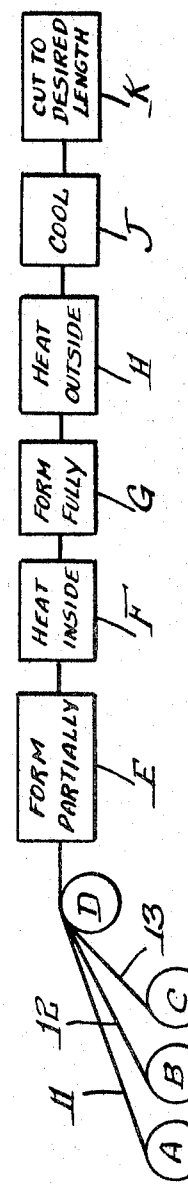
Inventor
George N. Jorgensen

United States Patent Office 3,461,222
Patented Aug. 12, 1969

3,461,222
INSULATED BUS BARS
George N. Jorgensen, Lexington, Ky., assignor to Square D Company, Park Ridge, Ill., a corporation of Michigan
Filed May 22, 1967, Ser. No. 640,067
Int. Cl. H01b 7/02
U.S. Cl. 174—117                                10 Claims

ABSTRACT OF THE DISCLOSURE

An assembly of insulated flat bus bars for feeder bus duct, each bus bar being wrapped in a composite sleeve consisting of two layers of polyester film separated by a layer of non-adhesive varnished glass cloth, and a plurality of the so insulated bus bars being stacked and spirally wound with tape without additional insulation between pairs of adjacent bus bars.

DESCRIPTION OF THE PRIOR ART

The prior art is represented by the insulating system disclosed in U.S. Patent No. 3,202,756. In the former insulating system, two relatively narrow strips of polyester film were laid on the adhesive side of a relatively wide strip of adhesive varnished glass cloth, and the assembly of adhesive varnished glass cloth with strips of polyester film secured thereto was then wrapped once around a flat bus bar with the strips of polyester film wrapped respectively over opposite edge portions of the bus bar on the inner side of the adhesive varnished glass cloth and opposite edge portions of the strip of adhesive varnished glass cloth lying closely adjacent each other but not overlapping. A second strip of adhesive varnished glass cloth with a pair of strips of polyester film secured thereto was then applied to the bus bar in a similar manner. A plurality of so insulated bus bars were then placed in a stack with an additional sheet of insulation inserted between each pair of adjacent bus bars and a pair of additional sheets of insulation placed respectively against the outer sides of the outer two bus bars, and tape was then wound spirally around the assembly of insulated bus bars and sheets of insulation to secure them together.

SUMMARY OF THE INVENTION

In the improved insulation system of this invention, each bus bar is wrapped in a composite sleeve consisting of two layers of polyester film separated by a layer of non-adhesive varnished glass cloth, and a plurality of so insulated bus bars are placed in a stack without additional insulation and spirally wrapped with tape. The composite sleeves are heat-formed from flat strips of stock, the two layers of polyester film retaining a tubular shape after being heat-formed, and the layer of varnished glass cloth being trapped therebetween. The new insulation system provides better insulation at lower material cost and lower labor cost.

BRIEF DESCRIPTION OF THE DRAWING

FIG. 1 is a fragmentary side view of an insulated flat bus bar constructed in accordance with the invention;

FIG. 2 is an enlarged sectional view taken along the line 2—2 of FIG. 1;

FIG. 3 is a fragmentary view of an assembly of bus bars constructed in accordance with the invention, a portion of a bus duct housing being shown in section; and FIG. 4 is a schematic view illustrating the process by which the insulation sleeve of the bus bar of FIG. 1 is formed.

DESCRIPTION OF THE PREFERRED EMBODIMENT

An insulated flat bus bar constructed in accordance with the invention includes a flat bus bar 10 provided with a composite insulating sleeve including a first layer 11 of polyester film, a layer 12 of non-adhesive varnished glass cloth, and a second layer 13 of polyester film. The layers of insulating material are heat-formed from flat strips into a tubular shape by a process illustrated schematically in FIG. 4, wherein the first layer 11 of polyester film is fed from a coil A, the layer 12 of non-adhesive varnished glass cloth is fed from a coil B, and the second layer 13 of polyester film is fed from a coil C, over a guide roller D and through various working stations E, F, G, H, J, and K respectively in which the composite insulation is formed into a generally U-shaped cross section, heated on the inside of the U-shaped cross section, formed into the cross-sectional shape of the bus bar 10, heated on the outside, cooled in an air stream, and cut to desired length. The heat-forming process is necessary because the polyester film is non-self-conforming as furnished by the manufacturer. That is, the polyester film tends to maintain its flat shape after being unrolled from a coil and resists being formed transversely around a bus bar. By the heat-forming process, the flat strips of polyester film, along with the strip of non-adhesive varnished glass cloth therebetween, are transformed into sleeves having a cross sectional shape conforming to the cross sectional shape of a bus bar such as the bus bar 10. The non-adhesive varnished glass cloth is not affected by the heat-forming process, but is frictionally held between the strips of polyester film after they are formed into a tubular shape corresponding to the shape of the bus bar 10. For this reason, no adhesive is required.

The original strips are wide enough so that after a sleeve is formed, the opposite edge portions of each layer of the composite sleeve overlap. Thus, as shown in FIG. 2, an edge portion 11a of the strip formed into the first layer 11 of polyester film overlaps an edge portion 11b, an edge portion 12a of the strip formed into the layer 12 of non-adhesive varnished glass cloth overlaps an edge portion 12b, and an edge portion 13a of the strip formed into the second layer 13 of polyester film overlaps an edge portion 13b. The edge portions 11a and 13a are aligned with each other and the edge portions 11b and 13b are aligned with each other, but the strip formed into the layer 12 of non-adhesive varnished glass cloth is shifted transversely so as to provide less accumulated thickness at the overlapping edge portions.

It will be understood that the thicknesses of the layers 11, 12, and 13 are shown greatly exaggerated in FIG. 2, for ease of illustration. In actual practice, the layers 11 and 13 of polyester film are each 0.005 inch thick, and the layer 12 of non-adhesive varnished glass cloth is 0.010 inch thick.

A bus bar assembly 14 constructed in accordance with the invention is shown in FIG. 3 and includes three bus bars 15, 16, and 17 all insulated with a composite sleeve identical to that shown in FIG. 2 for the bus bar 10. The so insulated bus bars 15, 16, and 17 are spirally wrapped together with insulating tape 18 and may be assembled in a bus duct housing including side wall portions 19 and 20 to form a section of bus duct. No additional sheets of insulation between pairs of adjacent bus bars, between the bus bar 15 and wall portion 19, or between the bus bar 17 and wall portion 20, are required.

I claim:
1. For use in a section of feeder bus duct, an individually wrapped bus bar comprising a flat elongated bus bar and a composite preformed insulating sleeve mounted thereon, said preformed insulating sleeve including two strips of insulating film preformed transversely to con- form to the cross-sectional shape of the bus bar before being mounted thereon and a strip of non-adhesive cloth disposed between the two strips of insulating film and frictionally held thereby with respect thereto, each of said strips extending transversely substantially once around said bus bar and having opposite longitudinal edge portions extending longitudinally of said bus bar.

2. An individually wrapped bus bar as claimed in claim 1, wherein the opposite longitudinal edge portions of each of said strips overlap on a flat side of said bus bar.

3. An individually wrapped bus bar as claimed in claim 2, wherein the strip of non-adhesive cloth is shifted transversely of the strips of insulating film.

4. An individually wrapped bus bar as claimed in claim 1, wherein the strip of non-adhesive cloth is shifted transversely of the strips of insulating film.

5. An assembly of individually wrapped flat elongated bus bars comprising a plurality of individually wrapped flat elongated bus bars each having a composite preformed insulating sleeve mounted thereon in accordance with claim 1, said individually wrapped bus bars being stacked flatwise and the composite preformed insulating sleeves of said bus bars being in direct contact with each other, and adhesive tape spirally wound around the plurality of individually wrapped bus bars.

6. An assembly of individually wrapped flat elongated bus bars as claimed in claim 5, wherein the opposite longitudinal edge portions of each of the strips of the composite preformed insulating sleeve of each of the bus bars overlap on a flat side of the bus bar.

7. An assembly of individually wrapped flat elongated bus bars as claimed in claim 6, wherein the strip of non-adhesive cloth of the composite preformed insulating sleeve of each of the bus bars is shifted transversely of the strips of insulating film.

8. An assembly of individually wrapped flat elongated bus bars as claimed in claim 5, wherein the strip of non-adhesive cloth of the composite preformed insulating sleeve of each of the bus bars is shifted transversely of the strips of insulating film.

9. An individually wrapped bus bar as claimed in claim 1, wherein the strips of insulating film are polyester film.

10. An individually wrapped bus bar as claimed in claim 1, wherein the strip of non-adhesive cloth is non-adhesive varnished glass cloth.

References Cited

UNITED STATES PATENTS

| | | | |
|---|---|---|---|
| 2,183,811 | 12/1939 | Homan | 174—117 |
| 3,033,727 | 5/1962 | Cram. | |
| 3,035,113 | 5/1962 | Danchuk. | |
| 3,202,756 | 8/1965 | Stanback. | |
| 3,297,970 | 1/1967 | Jones. | |

FOREIGN PATENTS

| | | |
|---|---|---|
| 409,280 | 4/1934 | Great Britain. |

ELLIOT A. GOLDBERG, Primary Examiner

U.S. Cl. X.R.

174—121